United States Patent
Dixneuf et al.

(10) Patent No.: US 10,933,952 B2
(45) Date of Patent: Mar. 2, 2021

(54) BEARING ARRANGEMENT FOR AN ELECTRIC SWIVEL

(71) Applicant: Single Buoy Moorings Inc., Marly (CH)

(72) Inventors: Georges Dixneuf, Bât. Aigue Marine (MC); Sami Barhoumi, Bât. Aigue Marine (MC); Frederic Sagot, Bât. Aigue Marine (MC); Samir Boutahar, Bât. Aigue Marine (MC); Terrence Lallouette, Bât. Aigue Marine (MC)

(73) Assignee: Single Buoy Moorings Inc., Marly (CH)

( * ) Notice: Subject to any disclaimer, the term of this patent is extended or adjusted under 35 U.S.C. 154(b) by 359 days.

(21) Appl. No.: 15/774,595

(22) PCT Filed: Nov. 18, 2016

(86) PCT No.: PCT/EP2016/078175
§ 371 (c)(1),
(2) Date: May 9, 2018

(87) PCT Pub. No.: WO2017/085277
PCT Pub. Date: May 26, 2017

(65) Prior Publication Data
US 2018/0327054 A1     Nov. 15, 2018

(30) Foreign Application Priority Data
Nov. 19, 2015 (EP) ...................................... 15195405

(51) Int. Cl.
*B63B 21/50* (2006.01)
*B23Q 1/01* (2006.01)
(Continued)

(52) U.S. Cl.
CPC ............ *B63B 21/507* (2013.01); *B23Q 1/015* (2013.01); *F16C 41/00* (2013.01); *F16C 41/02* (2013.01); *H01R 39/64* (2013.01)

(58) Field of Classification Search
CPC ....... B63B 21/507; B23Q 1/015; F16C 41/00; F16C 41/02; H01R 39/64
(Continued)

(56) References Cited

U.S. PATENT DOCUMENTS 5,755,607 A    5/1998   Boatman et al.
5,954,178 A *   9/1999   Fischer .................. F16D 28/00
                                                                      192/90
(Continued)

FOREIGN PATENT DOCUMENTS

EP       1002981 A1    5/2000
EP       2360089 A1    2/2010
(Continued)

*Primary Examiner* — Harshad C Patel
(74) *Attorney, Agent, or Firm* — N.V. Nederlandsch Octrooibureau; Catherine A. Shultz; Katelyn J. Bernier

(57) ABSTRACT

A electric swivel, LVES, in a swivel stack, includes an annular outer element defining a cylindrical chamber around an axis S and an cylindrical inner element coaxial with the outer element. The cylindrical chamber is sealed at an upper side with an annular cover and is configured for rotation relative to the inner and outer element around the axis S. The inner element includes at an inner radial side first and second bearing parts defining an inner bearing. The outer element includes at an outer radial side first and second bearing parts defining an outer bearing. The inner bearing includes an inner annular interface between the first and second bearing parts, the outer bearing includes an outer annular interface between the first and second bearing parts. Each of the
(Continued)

annular interfaces is coaxial with the inner and outer element, and each annular interface is configured as a flame conducting path.

17 Claims, 2 Drawing Sheets

(51) Int. Cl.
*F16C 41/00* (2006.01)
*H01R 39/64* (2006.01)
*F16C 41/02* (2006.01)

(58) Field of Classification Search
USPC .......................................................... 439/13
See application file for complete search history.

(56) References Cited

U.S. PATENT DOCUMENTS

| | | | |
|---|---|---|---|
| 6,222,690 B1* | 4/2001 | Tanaka | G11B 15/54 |
| | | | 242/334.4 |
| 7,690,434 B2* | 4/2010 | Baross | B63B 21/507 |
| | | | 166/354 |
| 8,038,562 B2* | 10/2011 | Suzuki | F16C 19/54 |
| | | | 475/179 |
| 8,854,168 B2* | 10/2014 | Bedini | B63B 21/507 |
| | | | 336/120 |
| 9,562,399 B2* | 2/2017 | Pollack | E21B 17/017 |
| 2005/0224484 A1* | 10/2005 | Matiash | B23K 9/1336 |
| | | | 219/137.2 |
| 2006/0205241 A1* | 9/2006 | Criaud | B60C 23/0467 |
| | | | 439/13 |

FOREIGN PATENT DOCUMENTS

| | | |
|---|---|---|
| GB | 2072434 A | 9/1981 |
| WO | 2009128724 A1 | 10/2009 |

* cited by examiner

BEARING ARRANGEMENT FOR AN ELECTRIC SWIVEL

FIELD OF THE INVENTION

The present invention relates to a bearing arrangement for a low voltage electric swivel (LVES). The present invention further relates to swivel stack comprising a low voltage electric swivel (LVES) with such a bearing arrangement.

BACKGROUND

Low voltage electric swivels (LVES) are used for transmitting electrical information and power from rotating to fixed parts of a swivel stack located on a FPSO/FLNG (Floating Production Storage and Offloading/Floating Liquefied Natural Gas) Turret. LVES enclosures use bearings between the fixed and rotating part, ensuring free rotation.

Following European (EN 60079-1) and International standards (IEC 60079-1), FPSO/FLNG swivel stacks are located in a hazardous zone 1 or zone 2. Equipment such as the LVES located in a swivel stack operates in the hazardous zone using explosion proof (Ex d) enclosures complying with the standards and need to be certified IIA or IIB, where IIA and IIB stand for different gas groups.

The primary function of an Ex d enclosure is to prevent the propagation of an internal explosion to the surrounding explosive atmosphere, and protecting the internal components from the environment, humidity, dirt, dust or water.

In the prior art, LVES enclosures using explosion proof bearings are known. A disadvantage of the existing bearings, is that the flame path is made locally. The method from the prior art requires extreme precision of machine tools, increasing costs, and is not reachable for gas group IIB. Further variation of temperature, bush wear, constraint of client, electrical temperature rise effects, maintenance inspections, makes the current low voltage electric swivels available only for the Ex d IIA standard. New low voltage standards need gas group IIB in order to operate in any conditions in the swivel stack.

European patent application EP 2 360 089 A1 describes a swivel for allowing fluid transfer across a rotary interface between the end of a fluid line connected to the seabed and product piping on a vessel for gas and oil production. The known swivel comprises an inner wall and an outer wall, defining between the two a toroidal chamber in order to receive hydrocarbons that will be fed via a guide that forms part of the inner wall, wherein the outer wall is rotatably connected to the inner wall by means of a bearing. An upper gap and a lower gap between the cylindrical surfaces of the inner wall and the outer wall are sealed off by sealing rings. A high voltage electro inductive power swivel is described in WO 2011/000937. From U.S. Pat. No. 5,755,607 a riser mounting arrangement for a mooring system is known, in which a riser turret and risers are fixed to a vessel for rotating with the vessel about a mooring line support base anchored to the sea floor.

SUMMARY OF THE INVENTION

An object of the invention is to provide a bearing arrangement for the LVES with improvement of the flame path properties.

A further object of the invention is to standardize the bearing with respect to both IIA and JIB groups.

This object is achieved by a low voltage electric swivel, LVES, for use in a swivel stack, comprising an annular outer element defining a cylindrical chamber around a longitudinal axis S and an cylindrical inner element coaxial with the outer element, wherein the cylindrical chamber is sealed at an upper side with an annular swivel cover and is configured for rotation relative to the inner and outer element around the longitudinal axis S; the inner element comprising at an inner radial side a first bearing part and a second bearing part defining an inner bearing; the outer element comprising at an outer radial side a first bearing part and a second bearing part defining an outer bearing; the annular swivel cover being connected at the inner radius thereof with the second bearing part of the inner bearing and at the outer radius thereof with the second bearing part of the outer bearing, and wherein the inner bearing comprises an inner annular interface between the first and second bearing part, the outer bearing comprises an outer annular interface between the first and second bearing part, wherein each of the inner and outer annular interfaces is coaxial with the inner and outer element, and wherein each annular interface is configured as a flame conducting path.

Advantageously, by using annular bearings with an annular interface that is coaxial to the longitudinal axis of the swivel, a bearing of JIB type can be implemented in the low voltage electric swivel. As the swivel comprises a standardized and certifiable JIB type bearing as inner and/or outer bearing, flame path protection is significantly improved. After qualification of such a swivel, the inspection of the flame path will be reduced and moreover not necessary.

Moreover, due to the arrangement of the inner and outer bearings with their annular interface coaxial to the swivel axis, no high precision tooling is required which lowers the fabrication costs.

Additionally, the bearing can be replaced or disassembled for detailed inspection. The standardization allows for quicker inspection.

Furthermore, the assembling is simplified. There is no need to adjust or match any machine parts. The standardization allows for quicker assembly.

Advantageously, in comparison to the prior art, the number of parts required is reduced, which increases reliability of the design.

Due to the fact that the annular interface is close to the fixed and rotating part of the bearing, the precision of the design is ensured.

According to an embodiment, the present invention relates to the low voltage electric swivel as described above, wherein each annular interface comprises lubricant to reduce wear of each annular interface during operation. Advantageously, the operating lifetime is prolonged, avoiding inspections during operation.

According to an embodiment, the present invention relates to the low voltage electric swivel as described above, wherein each annular interface comprises a ball bearing opening that defines in the direction of the longitudinal axis S, a lower and upper annular interface part below and above the ball bearing, respectively.

According to an embodiment, the present invention relates to the low voltage electric swivel as described above, wherein a longitudinal length of each lower annular interface part is at least 25 mm, more preferably at least 27.5 mm.

According to an embodiment, the present invention relates to the low voltage electric swivel as described above, wherein a longitudinal length of each upper annular interface part is at least 25 mm, more preferably at least 27.5 mm.

According to an embodiment, the present invention relates to the low voltage electric swivel as described above, wherein a height of each first bearing part is equal to a height of the corresponding second bearing part.

According to an embodiment, the present invention relates to the low voltage electric swivel as described above, wherein each annular interface (9'; 9") is sealed at both transversal sides with a respective seal ring. Advantageously, the seals keep the lubricant in the annular interface.

According to an embodiment, the present invention relates to the low voltage electric swivel as described above, wherein each annular interface comprises a gap between the first and second bearing part.

According to an embodiment, the present invention relates to a low voltage electric swivel as described above, wherein the annular swivel cover consists of, or comprises, two or more concentric rings that are connected at their interfaces. Preferably, an inner ring of said concentric rings is attached to said second bearing part of the inner bearing, and an outer ring of said concentric rings is attached to said second bearing part of said outer bearing.

Moreover, the present invention relates to a swivel stack comprising a low voltage electric swivel as described above.

Furthermore, the present invention relates to a vessel for offshore operations and comprising a turret mooring system, wherein the turret mooring system is equipped with a low voltage electric swivel or a swivel stack as described above.

In the context of this patent application it is to be understood that the invention applies to low voltage swivels (up to about 3 kV) but could also be applied to high voltage swivels (up to about 66 kV), in particular air filled high voltage swivels.

BRIEF DESCRIPTION OF DRAWINGS

The invention will be explained in more detail below with reference to drawings in which illustrative embodiments thereof are shown. They are intended exclusively for illustrative purposes and not to restrict the inventive concept, of which the scope is defined by the appended claims.

DETAILED DESCRIPTION OF EMBODIMENTS

Figure 1:
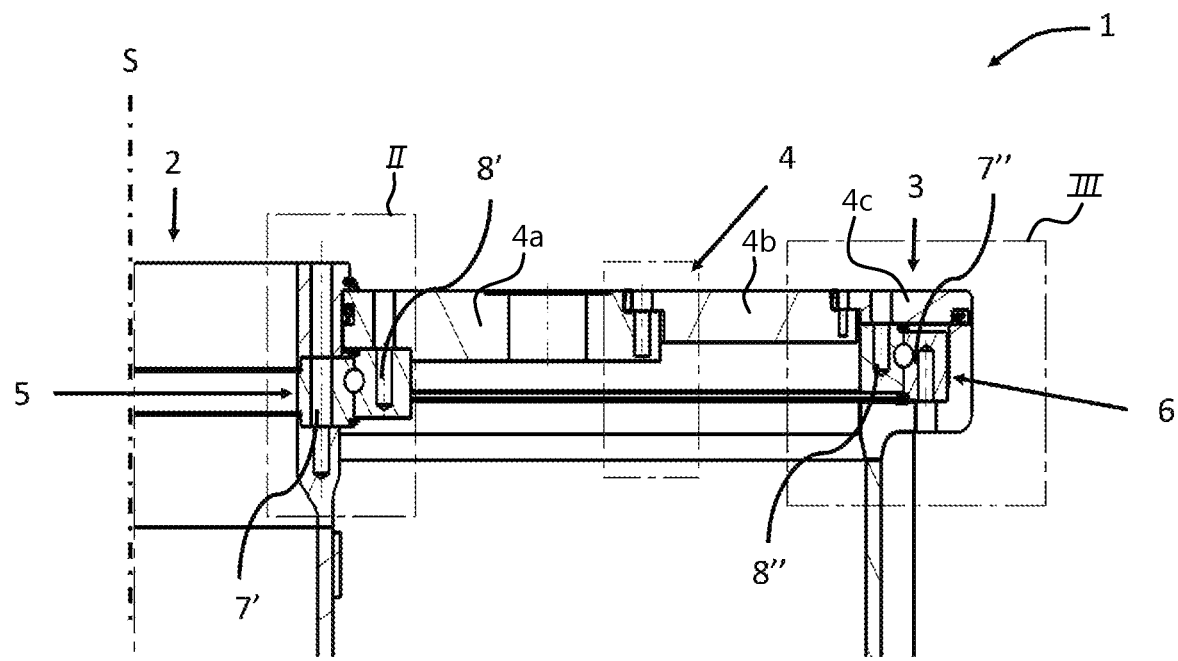
FIG. 1 shows a schematic view of a swivel seal of a low voltage electric swivel according to an embodiment of the invention.

FIG. 1 shows a schematic view of a swivel seal of a low voltage electric swivel 1. The low voltage electric swivel 1 comprises a cylindrical inner element 2 around a longitudinal axis S and an annular outer element 3. The outer element 3 defines a cylindrical chamber coaxial with the inner element 2. The low voltage electric swivel 1 further comprises an annular swivel cover 4. The annular swivel cover 4 is connected at an inner radial part with the cylindrical inner element 2 and at an outer radial part with the annular outer element 3. The annular swivel cover 4 thus seals the cylindrical chamber at an upper side. The swivel cover 4 is arranged for rotating movement relative to the inner and outer element 2, 3 around the longitudinal axis S.

The inner and outer element 2, 3 each comprise first bearing parts 7', 7" and corresponding second bearing parts 8', 8" at opposite radial sides of the swivel cover 4. The combination of a first bearing part 7', 7" with the corresponding second bearing part 8', 8" defines respectively an inner bearing 5 and an outer bearing 6.

Figure 2:
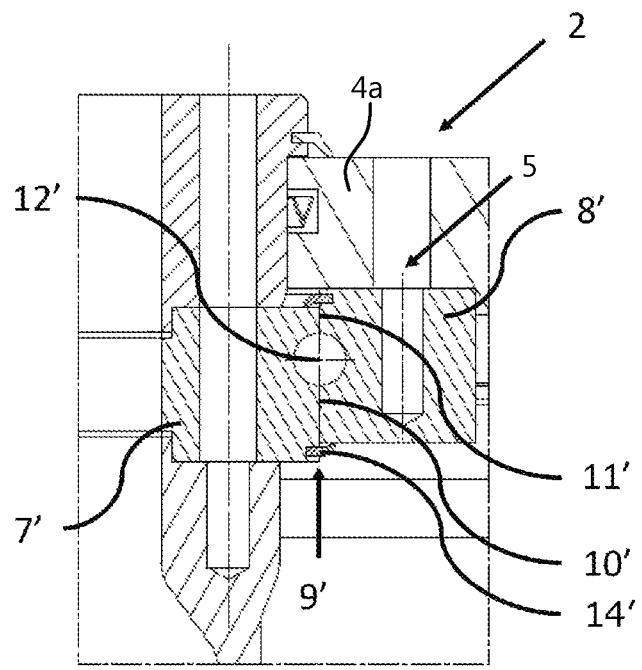
FIG. 2 shows a schematic view of the inner bearing shown in section II of FIG. 1.

FIG. 2 shows a schematic view of an inner bearing 5 of the low voltage electric swivel 1 as described in FIG. 1. The inner bearing is formed by a first bearing part 7' and a second bearing part 8'. The first bearing part 7' is connected to the inner element 2 and the second bearing part 8' is connected to the swivel cover 4, wherein the second bearing part 8' is provided at the inner radial side of the swivel cover 4. The first and second bearing parts 7', 8' are arranged for rotating movement relative to each other around the longitudinal axis S.

An inner annular gap is designed in between the first and second bearing parts 7', 8' that is coaxial to the swivel axis and that can function as an inner flame path.

The inner bearing 5 further comprises an annular interface 9' coaxial with the inner and outer element 2, 3 connecting the first and second bearing part 7', 8'. This annular interface may substantially coincide with the inner annular gap, at least along the upper and lower circumferential edges of said annular gap.

In an embodiment of the invention, the annular interface 9' comprises a ball bearing opening 12' defining a lower and upper annular interface part 10', 11'. The bearing opening 12' may of course have a diameter that is larger than the inner annular gap between the first bearing part 7' and the second bearing part 8', at least along the upper and lower circumferential edges of said annular gap.

In an embodiment of the invention a longitudinal length of the lower annular interface part 10' is at least 25 mm, more preferably 27.5 mm.

In an embodiment of the invention a longitudinal length of the upper annular interface part 11' is at least 25 mm, more preferably 27.5 mm.

In an embodiment of the invention, the width of the inner gap is 0.3 mm or less, at least along the circumferential upper and bottom edges of said gap.

In an embodiment of the invention a height of the first bearing part 7' is equal to a height of the second bearing part 8'.

In an embodiment of the invention the annular interface 9' is sealed at both transversal sides with a respective seal 14'.

Figure 3:
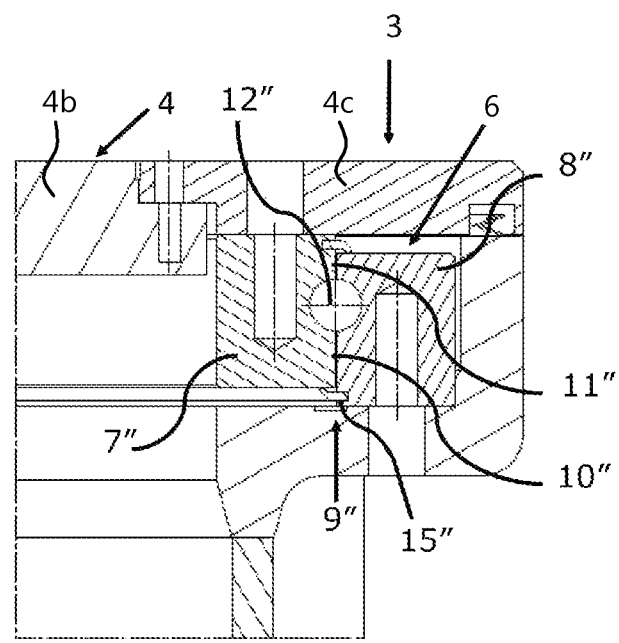
FIG. 3 shows a schematic view of the outer bearing shown in section III of FIG. 1.

FIG. 3 shows a schematic view of an outer bearing 6 of the low voltage electric swivel 1 as described in FIG. 1. The outer bearing is formed by a first bearing part 7" and a second bearing part 8". The first bearing part 7' is connected to the outer element 3 and the second bearing part 8" is connected to the swivel cover 4, wherein the second bearing part 8" is provided at the outer radial side of the swivel cover 4. The first and second bearing parts 7", 8" are arranged for rotating movement relative to each other around the longitudinal axis S of the swivel.

The outer bearing 6 further comprises an annular interface 9" coaxial with the inner and outer element 2, 3 connecting the first and second bearing part 7", 8".

An outer annular gap is designed in between the first and second bearing parts 7", 8" that is coaxial to the swivel axis and that can function as an outer flame path. The annular interface may substantially coincide with the outer annular gap, at least along the upper and lower circumferential edges of said annular gap.

In an embodiment of the invention the annular interface 9" comprises a ball bearing opening 12" defining a lower and upper annular interface part 10", 11". The bearing opening 12" may of course have a diameter that is larger than the outer annular gap between the first bearing part 7" and the second bearing part 8", at least along the upper and lower circumferential edges of said annular gap.

In an embodiment of the invention a longitudinal length of the lower annular interface part 10" is at least 25 mm, more preferably 27.5 mm.

In an embodiment of the invention a longitudinal length of the upper annular interface part 11" is at least 25 mm, more preferably 27.5 mm.

In an embodiment of the invention, the width of the outer gap is 0.3 mm or less, at least along the circumferential upper and bottom edges of said gap.

In an embodiment of the invention a height of the first bearing part 7" is equal to a height of the second bearing part 8".

In an embodiment of the invention, the annular interface 9" is sealed at both transversal sides with a seal ring 15".

According to an embodiment, the annular swivel cover 4 may consist of two or more concentric rings that are interconnected at their interfaces. As shown in FIG. 1, the annular swivel cover 4 comprises an inner ring 4a, a central ring 4b and an outer ring 4c, that are interconnected at their respective interfaces. Using concentric rings to construct the annular swivel cover 4 allows relatively easy removal of the cover 4 and thus simpler inspection or maintenance.

Other alternatives and equivalent embodiments of the present invention are conceivable within the idea of the invention, as will be clear to the person skilled in the art. The scope of the invention is limited only by the appended claims.

LIST OF REFERENCE SIGNS

1. Low Voltage Electric Swivel
2. Inner Element
3. Outer Element
4. Swivel Cover
4a, 4b, 4c. Concentric Rings
5. Inner Bearing
6. Outer Bearing
7', 7". First bearing part
8', 8". Second bearing part
9', 9". Annular Interface
10', 10". Lower Annular Interface Part
11', 11". Upper Annular Interface Part
12', 12". Ball Bearing Opening
14' Seal
15" Seal

The invention claimed is:

1. A low voltage electric swivel (LVES) for use in a swivel stack, comprising
an annular outer element defining a cylindrical chamber around a longitudinal axis S and an cylindrical inner element coaxial with the outer element, wherein the cylindrical chamber is sealed at an upper side with an annular swivel cover and is configured for rotation relative to the inner and outer element around the longitudinal axis S;
the inner element comprising at an inner radial side a first bearing part and a second bearing part defining an inner bearing;
the outer element comprising at an outer radial side another first bearing part and another second bearing part defining an outer bearing;
wherein the swivel is adapted for use with voltages up to 3 kV;
the annular swivel cover being connected at the inner radius thereof with the second bearing part of the inner bearing and at the outer radius thereof with the another second bearing part of the outer bearing,
wherein the inner bearing comprises an inner annular interface between the first and second bearing part, the outer bearing comprises an outer annular interface between the another first and second bearing parts,
wherein each of the inner and outer annular interfaces is coaxial with the inner and outer element, and
wherein each annular interface is configured as a flame path.

2. The low voltage electric swivel according to claim 1, wherein in the inner bearing an inner annular gap is designed between the first and second bearing parts that functions as an inner flame path, and wherein in the outer bearing an outer annular gap is designed between the another first and second bearings parts that functions as an outer flame path.

3. The low voltage electric swivel according to claim 2, wherein the width of the inner gap is 0.3 mm or less.

4. The low voltage electric swivel according to claim 2, wherein the width of the outer gap is 0.3 mm or less.

5. The low voltage electric swivel according to claim 1, wherein each annular interface comprises lubricant to reduce wear of each annular interface during operation.

6. The low voltage electric swivel according to claim 5, wherein each annular interface is sealed at both transversal sides with a respective seal ring.

7. The low voltage electric swivel according to claim 1, wherein each annular interface comprises a ball bearing opening that defines in the direction of the longitudinal axis S, a lower and upper annular interface part below and above the ball bearing, respectively.

8. The low voltage electric swivel according to claim 7, wherein a longitudinal length of each lower annular interface part is at least 25 mm.

9. The low voltage electric swivel according to claim 7, wherein a longitudinal length of each upper annular interface part is at least 25 mm.

10. The low voltage electric swivel according to claim 7, wherein a longitudinal length of each lower annular interface part is at least 27.5 mm.

11. The low voltage electric swivel according to claim 7, wherein a longitudinal length of each upper annular interface part is at least 27.5 mm.

12. The low voltage electric swivel according to claim 1, wherein a height of each first bearing part is equal to a height of the corresponding second bearing part.

13. The low voltage electric swivel according to claim 1, wherein the annular swivel cover consists of two or more concentric rings that are connected at their interfaces.

14. The low voltage electric swivel according to claim 13, wherein an inner ring of said concentric rings is attached to said second bearing part of the inner bearing, and wherein an outer ring of said concentric rings is attached to said another second bearing part of said outer bearing.

15. The low voltage electric swivel according to claim 1 for use in a swivel stack located on a FPSO/FLNG turret and adapted for transmitting electrical information and power from rotating to fixed parts of said swivel stack.

16. A swivel stack, comprising a low voltage electric swivel according to claim 1.

17. A vessel for offshore operations and comprising a turret mooring system, wherein the turret mooring system is equipped with a low voltage electric swivel according to claim 1.

* * * * *